United States Patent
Jagtap et al.

(10) Patent No.: US 10,761,988 B2
(45) Date of Patent: Sep. 1, 2020

(54) METHODS AND APPARATUS OF CACHE ACCESS TO A DATA ARRAY WITH LOCALITY-DEPENDENT LATENCY CHARACTERISTICS

(71) Applicant: Arm Limited, Cambridge (GB)

(72) Inventors: Radhika Sanjeev Jagtap, Cambridge (GB); Nikos Nikoleris, London (GB); Andreas Lars Sandberg, Cambridge (GB); Stephan Diestelhorst, Cambridge (GB)

(73) Assignee: Arm Limited, Cambridge (GB)

( * ) Notice: Subject to any disclaimer, the term of this patent is extended or adjusted under 35 U.S.C. 154(b) by 6 days.

(21) Appl. No.: 16/142,330

(22) Filed: Sep. 26, 2018

(65) Prior Publication Data
US 2020/0034303 A1 Jan. 30, 2020

(30) Foreign Application Priority Data
Jul. 25, 2018 (GR) .............................. 20180100340

(51) Int. Cl.
*G06F 12/0864* (2016.01)
*G06F 12/1045* (2016.01)

(52) U.S. Cl.
CPC ...... *G06F 12/0864* (2013.01); *G06F 12/1045* (2013.01); *G06F 2212/6082* (2013.01)

(58) Field of Classification Search
CPC ............ G06F 12/0864; G06F 12/1045; G06F 2212/6082; G06F 2212/6026; G06F 2212/1016; G06F 12/0862

USPC ................................. 711/133, 137, 128, 144
See application file for complete search history.

(56) References Cited

U.S. PATENT DOCUMENTS

| | | | |
|---|---|---|---|
| 2003/0014597 A1* | 1/2003 | van de Waerdt | G06F 12/0864 711/136 |
| 2005/0091457 A1* | 4/2005 | Auld | G06F 12/0897 711/128 |
| 2006/0004963 A1* | 1/2006 | Mattina | G06F 12/121 711/130 |
| 2017/0046266 A1* | 2/2017 | McIlvaine | G06F 12/128 |

(Continued)

OTHER PUBLICATIONS

The Cache Memory Book Second Edition, Jim Handy, Academic Press, entire 123 pages, (Year: 1993).*

(Continued)

*Primary Examiner* — Hong C Kim
(74) *Attorney, Agent, or Firm* — Nixon & Vanderhye P.C.

(57) ABSTRACT

Aspects of the present disclosure relate to an apparatus comprising a data array having locality-dependent latency characteristics such that an access to an open unit of the data array has a lower latency than an access to a closed unit of the data array. Set associative cache indexing circuitry determines, in response to a request for data associated with a target address, a cache set index. Mapping circuitry identifies, in response to the index, a set of data array locations corresponding to the index, according to a mapping in which a given unit of the data array comprises locations corresponding to a plurality of consecutive indices, and at least two locations of the set of locations corresponding to the same index are in different units of the data array. Cache access circuitry accesses said data from one of the set of data array locations.

15 Claims, 5 Drawing Sheets

(56) References Cited

U.S. PATENT DOCUMENTS

2019/0042439 A1\* 2/2019 Drerup ................ G06F 12/0815
2019/0155733 A1\* 5/2019 Hagersten ........... G06F 12/0895

OTHER PUBLICATIONS

M. Qureshi et al., "Fundamental Latency Trade-offs in Architecting DRAM Caches", *IEEE*, Apr. 4, 2013, 12 pages.

\* cited by examiner

METHODS AND APPARATUS OF CACHE ACCESS TO A DATA ARRAY WITH LOCALITY-DEPENDENT LATENCY CHARACTERISTICS

This application claims priority to GR Patent Application No. 20180100340 filed Jul. 25, 2018, the entire contents of which are hereby incorporated by reference.

BACKGROUND

Technical Field

The present technique relates to the field of cache memory, and in particular methods and apparatus for providing an address mapping scheme and a replacement policy for cache memory.

TECHNICAL BACKGROUND

A cache memory is a memory that stores data so that future accesses to that data can be performed more quickly. For example, a processing system may have a main memory and a cache memory, the cache memory having a lower access latency than the main memory. Data that is likely to be required for processing can be temporarily stored in the cache memory in order to reduce the time required to retrieve that data. The cache can thus store a subset of the data of the main memory. Another example of a cache memory is a memory that stores computed values, the values being subsequently recomputed if evicted from the cache.

A cache may be implemented in a memory with substantially locality-independent latency characteristics, for example static random access memory (SRAM). In such a memory, in cases where the request hits in the cache, the access latency is substantially independent of the particular cache location being accessed and may be relatively low as compared with other types of memory. However, such memory is frequently more expensive than other types of memory.

Alternatively, a cache may be implemented in a memory with locality-dependent latency characteristics, such that in cases where the request hits in the cache, the access latency depends on the particular cache location being accessed. An example of such a memory is a dynamic random access memory (DRAM). In a DRAM, memory locations are organised in rows that can be accessed using a row buffer. Loading a given row into the row buffer is relatively time-consuming, but the latency is lower for subsequent accesses to memory locations of that row. The access latency thus depends on whether a row to be accessed is "open" (i.e. already loaded into the row buffer) or "closed" (i.e. not loaded into the row buffer). Despite this disadvantage, the implementation of a cache with such memory has the advantage that it is frequently cheaper per unit of stored data than memory such as SRAM with substantially locality-independent latency, so this makes it more feasible to provide caches with larger storage capacity.

SUMMARY

At least some examples provide an apparatus comprising:
a data array having locality-dependent latency characteristics such that an access to an open unit of the data array has a lower latency than an access to a closed unit of the data array;
set associative cache indexing circuitry to determine, in response to a request for data associated with a target address, a cache set index corresponding to the target address;
mapping circuitry to identify, in response to the cache set index, a set of data array locations of the data array corresponding to the cache set index, according to a mapping in which a given unit of the data array comprises data array locations corresponding to a plurality of consecutive set indices, and at least two memory locations of the set of data array locations corresponding to the same cache set index are in different units of the data array; and
cache access circuitry to access said data associated with the target address from one of the set of data array locations identified by the mapping circuitry.

Further examples provide a method comprising:
determining, in response to a request for data associated with a target address, a cache set index corresponding to the target address;
identifying, in response to the cache set index, a set of data array locations of a data array corresponding to the cache set index, wherein:
the cache memory has locality-dependent latency characteristics such that an access to an open unit of the data array has a lower latency than an access to a closed unit of the data array; and
the identifying is according to a mapping in which the set of data array locations corresponding to the same cache set index are in different units of the data array, and a given unit of the data array comprises data array locations corresponding to a plurality of consecutive set indices, and
accessing said data associated with the target address from one of the set of data array locations identified by the mapping circuitry.

Further examples provide an apparatus comprising:
a data array having locality-dependent latency characteristics such that accesses to low latency parts of the data array have lower latency than accesses to high latency parts of the data array; and
victim selection circuitry to select a victim cache location of the data array in which to store a data item to be allocated to the data array; in which:
the victim selection circuitry is to select the victim cache location based on a prediction of a part of the data array that will be a low latency part when the data item is retrieved from the data array.

Further aspects, features and advantages of the present technique will be apparent from the following description of examples, which is to be read in conjunction with the accompanying drawings.

DESCRIPTION OF EXAMPLES

As noted above, in some examples an apparatus comprises a cache memory. Such a cache memory comprises a data array comprising units of memory. Each unit is an amount of cache storage, i.e. a number of addressable data array locations, which can be in either an open state or a closed state. Each location within a given unit has the same open/closed state, such that a given unit can transition as a whole between the open state and the closed state. The data array has locality-dependent latency characteristics such that an access to an open unit of the data array has a lower latency than an access to a closed unit of the data array. In examples, each such unit of the data array has the same size as a read buffer of the data array. For example, the data array may be a DRAM and a given unit may be a row of the DRAM.

The apparatus comprises set associative cache indexing circuitry to determine, in response to a request for data associated with a target address, a cache set index corresponding to the target address. For example, the data associated with the target address may be required for a processing operation performed by a processor associated with the cache memory. The cache set index may for example be based on a function of selected bits of the target address.

The apparatus comprises mapping circuitry to identify, in response to the cache set index, a set of data array locations of the data array corresponding to the cache set index. The identifying is according to a mapping in which a given unit of the data array comprises data array locations corresponding to a plurality of consecutive set indices, and at least two memory locations of the set of data array locations corresponding to the same cache set index are in different units of the data array. The mapping circuitry 120 is shown as a separate component, but in some examples the mapping circuitry 120 is a logical component implemented by the indexing circuitry 110.

The apparatus comprises cache access circuitry to access said data associated with the target address from one of the set of data array locations identified by the mapping circuitry.

In many set-associative-cache-based systems, tags are stored that each identify part of a cached address. The tags for each location within a given set can thus be used to determine whether the data in a given cache location in fact corresponds to the target address, or whether it corresponds to a different address. In a comparative system that implements a cache within a DRAM, each tag is stored in a DRAM location adjacent to the data to which it corresponds. In such a comparative system, multiple such tag/data pairs of the same set may be stored in the same DRAM row in order to minimise the number of rows that must be accessed when accessing the tags of a given set, and thereby reduce the overall access latency.

Many applications exhibit linear address access patterns, such that a series of memory addresses are accessed in a linear sequence. Cache indexing functions will tend to map such addresses to consecutive set indices. Returning to the apparatus of the present disclosure, as a consequence of the mapping described above, contiguous indices are mapped to the same unit of the cache. Linearly addressed blocks therefore correspond to a series of accesses to the same unit of the cache. Conversely, in the comparative system described above, different set indices (even where consecutive) would typically be mapped to different units of the data array. As a consequence of the latency characteristics described above, the overall latency for such a series of accesses to the same unit is lower than the latency for a series of accesses to different units. For example, the unit may be loaded into a unit buffer, such as a row buffer of a DRAM, following which the series of accesses correspond to unit buffer hits. The latency for accesses to the cache within the present apparatus is thereby improved relative to systems, such as the above-described comparative system, in which such a mapping is not employed.

In some examples, the data array comprises a plurality of parallel memory arrays. For example, in particular in examples in which the data array is implemented in DRAM, each parallel memory array may be a bank of the data array. In such examples, different memory arrays can be accessed in parallel such that accesses to different arrays can be serviced concurrently. The mapping may then be such that data array locations corresponding to different ways of the cache are in different parallel memory arrays of the data array. The different ways, for example corresponding to the same set index, can therefore be accessed without such accesses impeding each other. Overall access latency is thereby reduced.

In some examples the mapping circuitry comprises a tag memory to, for each cache set index, identify at least a portion of an address of data stored in the corresponding set of data array locations. An example of usage of such tags is described above. The tag memory may have shorter latency than the data array. For example, the tag memory may be a SRAM. The aforementioned address portion, or tag, can thus be accessed relatively quickly, without being subject to the same location-dependent latency characteristics as the data array. The latency is thus greatly reduced relative to comparative systems in which the tags are stored in the data array, as such comparative systems would typically require access to multiple memory units in order to check each tag for a given set and therefore exhibit high latency.

In examples, the apparatus comprises victim selection circuitry to select a victim cache location of the data array in which to store a data item to be allocated to the data array. The victim selection circuitry is to select the victim cache location based on a prediction of a unit of the data array that will be an open unit when the data item is retrieved from the data array. Thus, the latency of retrieval of the data item is reduced relative to comparative systems in which the victim cache location is selected without such a prediction. The selection of a victim cache location may be termed a "replacement policy".

In some examples in which such prediction is performed, the predicted unit of the data array is a unit of the data array that is open when the predicting is performed. This replacement policy works on the assumption that accesses frequently follow a pattern that repeats. Based on this, it can be assumed that a unit that is open when the data item in question is initially accessed and stored in the cache (i.e. when the predicting is performed during the victim selection), is also likely to be open when the data item is subsequently accessed.

In other examples in which such prediction is performed, the victim selection circuitry is to select the victim cache location, from a plurality of potential victim cache locations determined based on the prediction, based additionally on a prediction of future access to each of the plurality of potential victim cache locations. For example, the plurality of potential victim cache locations may all be within the same unit of the data array and thus either all be open or all be closed when the data item is retrieved. The apparatus can thus select the victim cache location from amongst the potential locations based on an assumption of which of the potential locations is least likely to be accessed in the future. For example, the prediction of future access may be based on relative recency of access to each of the plurality of potential victim cache locations. In this example, it may be assumed that cache locations that were more recently accessed are more likely to be accessed again in the future, such that the likelihood of future access drops as the recency of the latest access to that cache location decreases. The victim cache location can thus be selected as the potential location which was accessed least recently. Alternatively or additionally, other replacement policies may be implemented. For example, it may be attempted to perform victim selection such that contiguous memory addresses are placed in the same unit of the data array.

Alternatively or additionally, the victim selection circuitry may be to determine a given cache location corresponding to a given data item that is to remain in the cache. The victim selection circuitry then selects the victim cache location to maintain the given data item in the cache. For example, certain data may be flagged as critical data that is not to be removed from the cache. In some examples, the victim selection circuitry maintains such a data item in the cache by selecting, as the victim cache location, a cache location other than the given cache location. In other words, a "second-best" victim cache location may be selected. In other examples, the victim selection circuitry maintains such a data item in the cache by storing the given data item in a further cache location different from the given cache location and selecting, as the victim cache location, the given cache location. In other words, the critical data item is moved to a different cache location so that the "best" victim cache location can be selected.

As noted above, in some examples there is provided an apparatus comprising a data array having locality-dependent latency characteristics such that accesses to low latency parts of the data array have lower latency than accesses to high latency parts of the data array. For example, each part of the data array may be a row of the data array.

The apparatus comprises victim selection circuitry to select a victim cache location of the data array in which to store a data item to be allocated to the data array. Potential victim cache locations can be determined by looking up the set index of the data item in the aforementioned tag memory. The victim selection circuitry can then select from amongst these locations based on a prediction of a part of the data array that will be a low latency part when the data item is retrieved from the data array.

Some comparative systems implement a replacement policy which prioritises cache hit rate by aiming to select the victim cache location which is least likely to be accessed again in the future. Conversely, the presently described replacement policy takes into account the predicted access latency of the victim cache location. While sometimes this could increase the likelihood of removing from the cache a data item that will in fact be required in the future, which may negatively impact latency as a consequence of the resulting cache miss, this also significantly increases the likelihood that successive requests will be directed to an open unit of the cache. The resulting latency improvement is achieved on many more accesses, such that the reduced cache hit rate is more than compensated. The overall latency is thus improved relative to the comparative systems.

Similarly to other examples described above, the present example provides reduced overall access latency compared with comparative systems in which such a prediction is not performed.

In some such examples, each low latency part of the data array is a part of the data array in a low latency state and each high latency part of the data array is a part of the memory in a high latency state. The low or high latency nature of a given part can thus be transient, such that a given part can transition between the high and low latency states. For example, in apparatuses in which each part is a row of the data array, a closed row can be said to be in the high latency state and an open row can be said to be in the low latency state. An access to a given part of the memory in the high latency state may cause the given part to transition to the low latency state. For example, in examples in which the data array is a DRAM, an access to a memory location in a closed row causes that row to be loaded into a row buffer and thereby become an open row. Consequently, the row that was previously loaded into the row buffer, and thus open, is removed from the row buffer, and thereby becomes closed. The present example provides reduced latency, relative to comparative systems in which the high and low latency states of parts of the cache are not taken into account by victim selection circuitry, in a similar manner to that described above.

Examples of the present disclosure will now be described with reference to the Figures.

Figure 1:
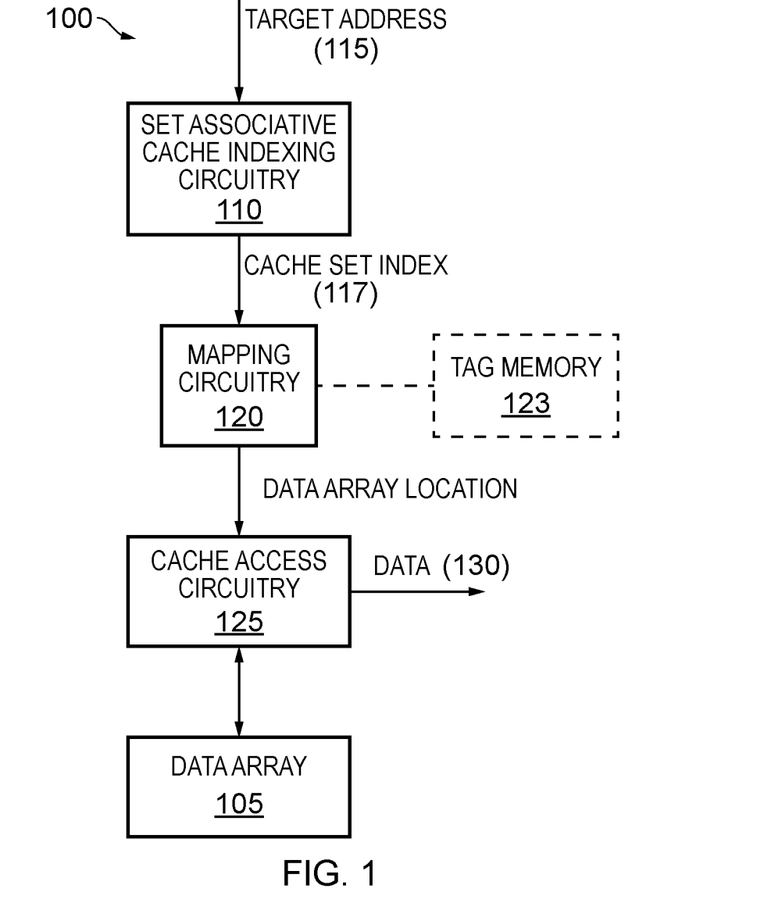
FIG. 1 shows schematically an apparatus according to examples of the present disclosure.

FIG. 1 shows schematically a cache memory apparatus 100 according to examples of the present disclosure. The apparatus 100 can be implemented by general-purpose components, or by dedicated circuitry. The apparatus 100 may for example form part of a processing apparatus such as a central processing unit or graphics processing unit.

The apparatus 100 comprises a data array 105. The apparatus 100 implements a set associative cache such that memory addresses are mapped to locations of the data array 105. The data array 105 is a DRAM and comprises rows of memory as set out below in more detail in relation to FIG. 2. Each row comprises a plurality of memory locations. As set out above, the data array 105 has locality-dependent latency such that an access to an open row has a lower latency than an access to a closed row.

The apparatus 100 comprises set associative cache indexing circuitry 110. The indexing circuitry 110 receives a request 115 for data associated with a target address. In response to the request, the indexing circuitry 110 determines a cache set index 117 corresponding to the target address. The cache set index identifies a set of data array locations. For example, the set index may be equal to a selected bit portion of a memory address, or a hash function of the selected bit portion.

The apparatus 100 comprises mapping circuitry 120 which receives the cache set index from the indexing circuitry 110. Based on this, the mapping circuitry 120 determines the aforementioned set of data array locations identified by the cache set index. The determining is based on a mapping in which a given row of the data array 105 comprises data array locations corresponding to consecutive set indices, and at least two memory locations of the set of locations corresponding to the same set index are in different rows of the data array 105. This mapping is described in more detail below with reference to FIG. 3.

The apparatus 100 may comprise tag memory 123. The tag memory is configured to, for each set index, identify at least a portion of an address of data stored in the corresponding set of locations. This portion can thus be used to determine whether a given data item is present in the data array 105.

The apparatus 100 comprises cache access circuitry 125 to receive the data array location and, based on this, access the data associated with the target address 115 from one of the set of data array locations identified by the mapping circuitry 120. The target data is thereby retrieved from the data array 105 and output 130.

As noted above, target addresses are frequently requested in a linear pattern and thus data array locations for such addresses resolve to consecutive indices. The mapping therefore maps such consecutive indices to the same row of the data array 105 such that a series of linearly requested target addresses corresponds to a series of data array locations within the same row. This increases the likelihood that a given required row of the memory 105 will already be open at the time of the request, reducing the overall access latency.

Figure 2:
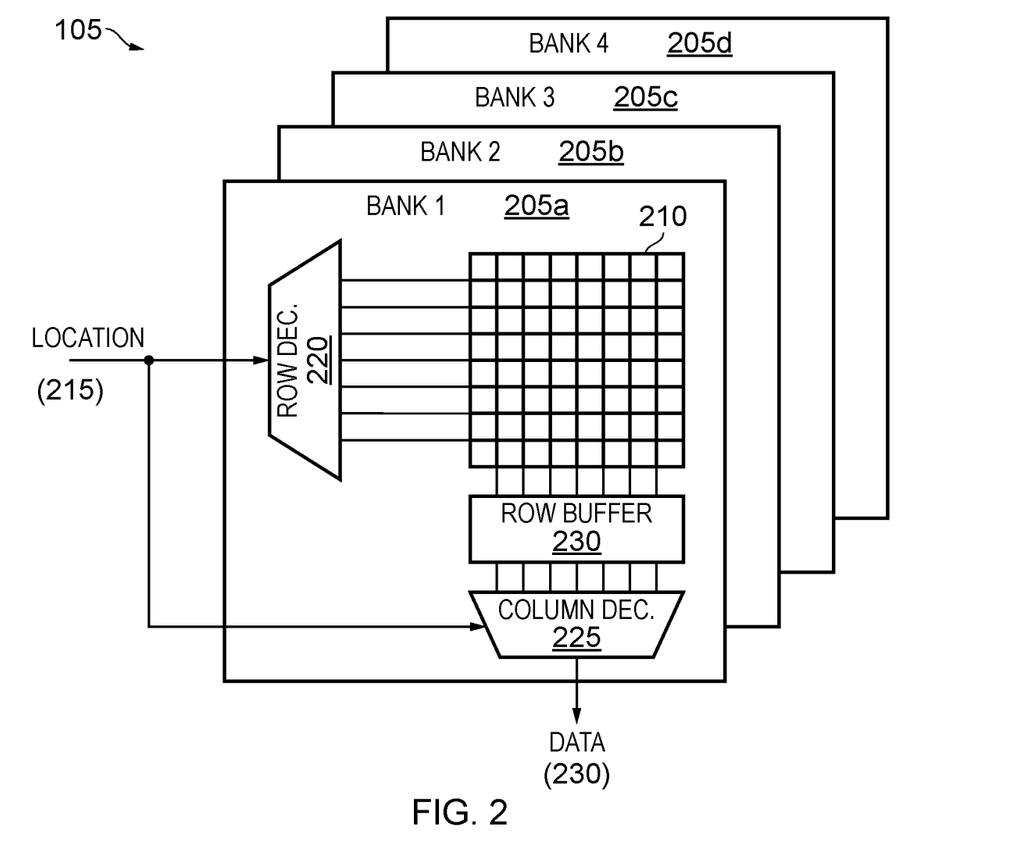
FIG. 2 shows schematically the structure of a DRAM data array.

FIG. 2 shows schematically the structure of the DRAM data array 105.

The data array 105 comprises a number of banks 205a-205d. The banks 205a-205d can be accessed in parallel.

Each bank comprises a two-dimensional array of memory locations 210 arranged into rows and columns. It should be noted that this arrangement is a logical arrangement, and the physical layout of memory circuitry within the memory 105 may not directly correspond to such a logical grid.

A requested data array location is received 215 by a row decoder 220 and a column decoder 225. Based on the row index, the row decoder 220 activates the particular row of the array of memory locations 210 that corresponds to the received memory location. That row is loaded into a row buffer 230. The column decoder 225 identifies the columns that corresponds to the requested data array location; the data corresponding to that location is then output 230.

As noted above, DRAM access has a variable latency. The latency depends on:
1. desired row is open, i.e. row buffer hit: low access latency, example 18+ ns
2. bank is closed/precharged (no row is currently open): medium access latency, example 32+ ns
3. different row open in the same bank as the desired row (also known as bank conflict): high access latency, example 42+ ns.

Figure 3:
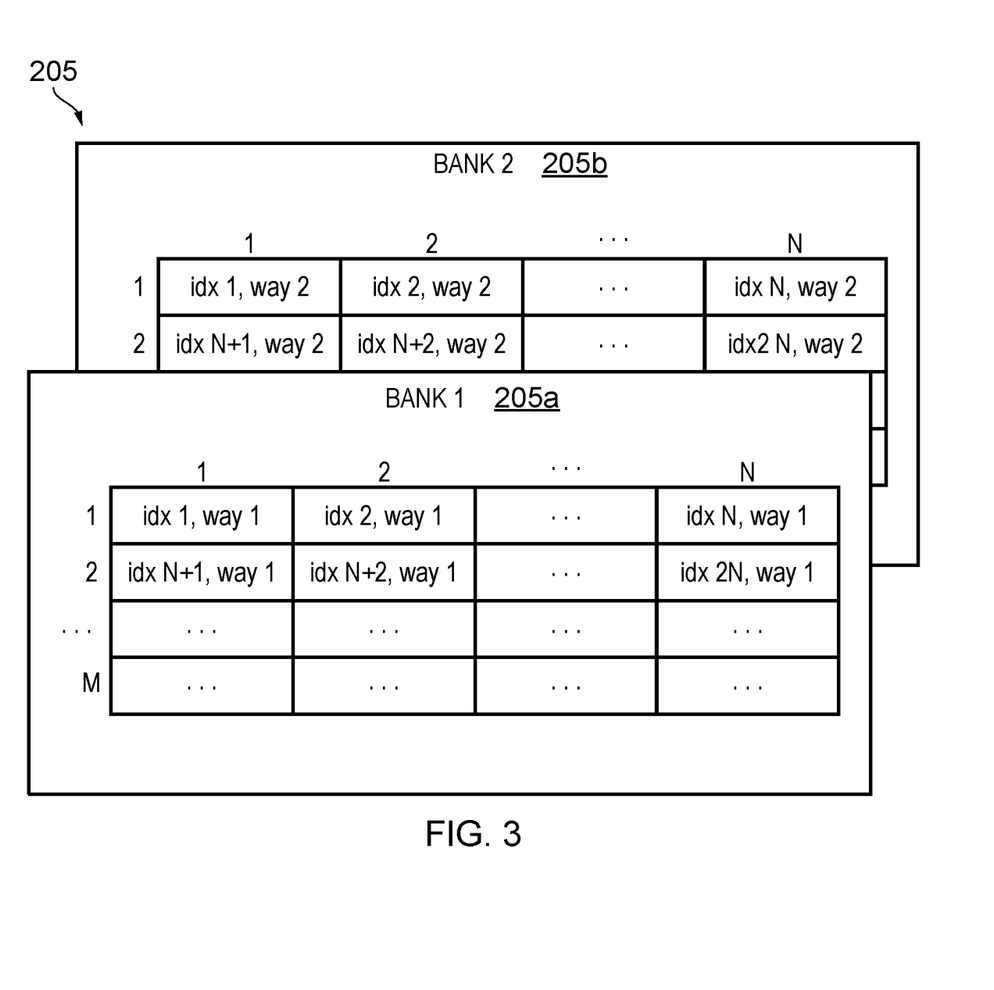
FIG. 3 illustrates a mapping of set associative cache sets and ways to memory locations within banks of a data array.

FIG. 3 illustrates the aforementioned mapping of set associative cache sets and ways to memory locations within banks 205 of the data array 105. Specifically, two banks 205a, 205b are shown.

Each bank 205 comprises memory locations arranged into an array of N columns and M rows. Within one row of the DRAM, continuous set indices 1 to N are mapped to successive addressable memory locations of the first row of the cache. Set indices N+1 to 2N are then mapped to the second row of the cache. This pattern is continued such that consecutive series of set indices of length N are mapped to consecutive rows of the data array 105. In other words, one row of the bank 205 includes locations corresponding to multiple different set indices.

In examples, different ways of the cache are mapped to different banks 205 of the data array 105. For example, in FIG. 3 each way of the cache is mapped to a different bank 205 of the data array 105. Thus, for example, cache blocks of the first way of the cache are mapped to memory locations in the first bank 205a, and cache blocks of the second way of the cache are mapped to memory locations in the second bank 205b. In other examples, multiple ways are mapped to a given bank such that, for example in a system with a four-way cache, the first and second ways are mapped to the first bank 205a, and the third and fourth ways are mapped to the second bank 205b. As noted above, each bank 205 can be accessed in parallel. This mapping therefore reduces the access latency associated with accessing cache blocks in different ways of the cache.

In one example in which multiple channels are provided, data locations corresponding to the same cache index are allocated to different channels. This can improve parallel access of these data locations.

Figure 4:
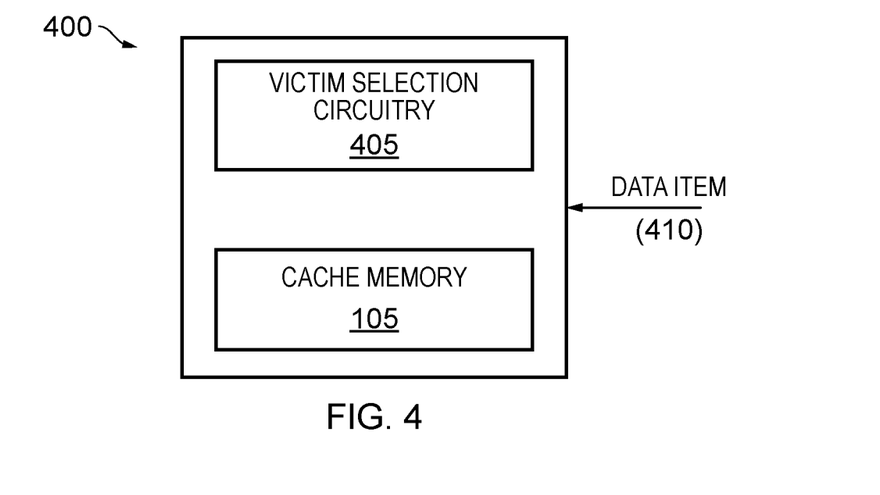
FIG. 4 shows schematically an apparatus configured to perform victim selection.

FIG. 4 shows schematically an apparatus 400 configured to perform victim selection in order to select a particular victim cache location in which to store a data item that is to be allocated to the data array 105. The apparatus 400 may be implemented within the system 100 of FIG. 1.

The apparatus 400 comprises the data array 105 and victim selection circuitry 405. The apparatus receives a data item 410 for allocation to the cache.

The victim selection circuitry 405 is configured to select a particular victim cache location, from the plurality of potential victim cache locations that satisfy the cache set index corresponding to the memory address of the data item, in which to store the data item. The selection is based on a prediction of a row of the data array 105 that will be an open row when the data item is retrieved from the data array 105.

It is frequently the case that data items are required in a repeating pattern. In such situations, a row of the data array 105 that is open when a given data item is initially accessed and stored in the data array 105 is more likely to also be open when that data item is subsequently retrieved from the data array 105. Thus, the predicted row may be a row that is open when the predicting is performed. The overall access latency is thereby reduced. Where multiple potential victim locations lie within open rows of banks of the data array 105, the predicting may further be based on additional parameters. For example, it may be assumed that recently accessed locations are more likely to be accessed again, and the data item may thus be allocated to the least-recently-accessed location of the potential locations.

Alternatively or additionally, the victim selection may take into account address adjacency, such that it is attempted to lay out physical addresses contiguously within a row.

Figure 5:
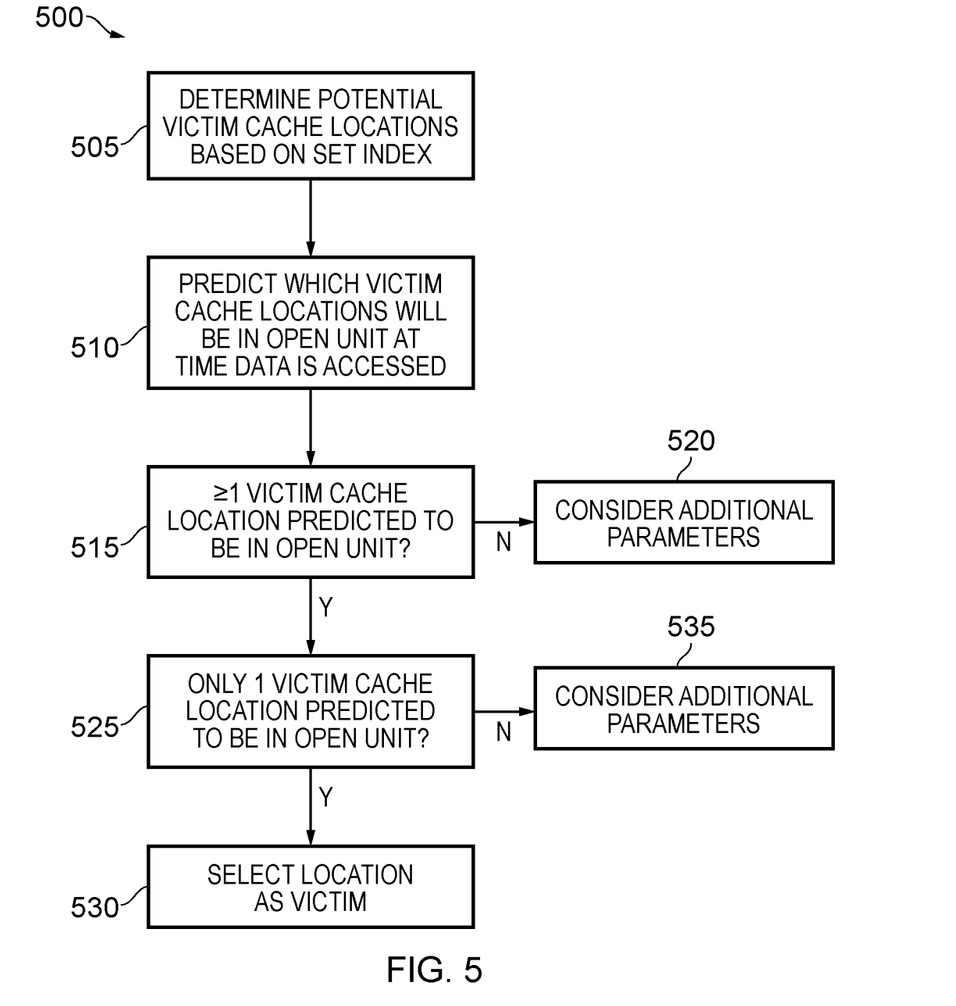
FIG. 5 shows a flow chart exhibiting an example method that may be employed by the apparatus of FIG. 4.

FIG. 5 shows a flow chart exhibiting an example method 500 that may be employed by the apparatus 400 to take into account such additional parameters.

At block 505, the victim selection circuitry 405 determines potential victim cache locations based on a set index as described elsewhere herein.

At block 510, the victim selection circuitry 405 predicts which of the potential victim cache locations will be in an open unit of the data array 105 at a time when the data item is accessed, as described in more detail above.

At block 515, it is identified whether at least one potential victim cache location was predicted to be in an open unit. If no victim locations were predicted to be in an open unit, flow proceeds to block 520 where additional parameters are used to select a victim cache location. For example, the victim cache location may be selected as the location containing the data that is least likely to be required in the future. In general, the victim cache location may be selected as any of the indexed set of locations. If, however, at least one victim cache location was predicted to be in an open unit, flow proceeds to block 525.

At block 525, it is identified whether exactly one victim cache location was predicted to be in an open unit. If so, flow proceeds to block 530 where that location is selected as the victim cache location. However, if more than one potential victim cache location was identified, flow proceeds to block 535 where additional parameters are considered in order to select between the identified locations. For example, the victim cache location may be selected as the identified location containing data that is least likely to be required in the future. This may for example be the identified location that was least recently accessed.

In the present application, the words "configured to ..." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   a data array having locality-dependent latency characteristics such that an access to an open unit of the data array has a lower latency than an access to a closed unit of the data array;
   set associative cache indexing circuitry to determine, in response to a request for data associated with a target address, a cache set index corresponding to the target address;
   mapping circuitry to identify, in response to the cache set index, a set of data array locations of the data array corresponding to the cache set index, according to a mapping in which a given unit of the data array comprises data array locations corresponding to a plurality of consecutive set indices, and at least two memory locations of the set of data array locations corresponding to the same cache set index are in different units of the data array; and
   cache access circuitry to access said data associated with the target address from one of the set of data array locations identified by the mapping circuitry.

2. An apparatus according to claim 1, wherein the mapping is such that data array locations corresponding to different ways of the cache are in different parallel memory arrays of the data array.

3. An apparatus according to claim 2, wherein each parallel memory array is a bank of the data array.

4. An apparatus according to claim 1, wherein the mapping circuitry comprises a tag memory to, for each cache set index, identify at least a portion of an address of data stored in the corresponding set of data array locations.

5. An apparatus according to claim 4, wherein the tag memory has shorter latency than the data array.

6. An apparatus according to claim 4, wherein the tag memory is a static random access memory.

7. An apparatus according to claim 1, wherein the data array is a dynamic random access memory.

8. An apparatus according to claim 1, wherein:
   the apparatus comprises victim selection circuitry to select a victim cache location of the data array in which to store a data item to be allocated to the data array; and
   the victim selection circuitry is to select the victim cache location based on a prediction of a unit of the data array that will be an open unit when the data item is retrieved from the data array.

9. An apparatus according to claim 8, wherein the predicted unit of the data array is a unit of the data array that is open when the predicting is performed.

10. An apparatus according to claim 8, wherein the victim selection circuitry is to select the victim cache location, from a plurality of potential victim cache locations determined based on the prediction, based additionally on a prediction of future access to each of the plurality of potential victim cache locations.

11. An apparatus according to claim 10, wherein the prediction of future access is based on relative recency of access to each of the plurality of potential victim cache locations.

12. An apparatus according to claim 8, wherein the victim selection circuitry is to:
   determine a given cache location corresponding to a given data item that is to remain in the cache; and
   select the victim cache location to maintain the given data item in the cache.

13. An apparatus according to claim 12, wherein the victim selection circuitry is to select the victim cache location to maintain the given data item in the cache by:
   selecting, as the victim cache location, a cache location other than the given cache location.

14. An apparatus according to claim 12, wherein the victim selection circuitry is to select the victim cache location to maintain the given data item in the cache by:
   storing the given data item in a further cache location different from the given cache location; and
   selecting, as the victim cache location, the given cache location.

15. A method comprising:
   determining, in response to a request for data associated with a target address, a cache set index corresponding to the target address;
   identifying, in response to the cache set index, a set of data array locations of a data array corresponding to the cache set index, wherein:
      the data array has locality-dependent latency characteristics such that an access to an open unit of the data array has a lower latency than an access to a closed unit of the data array; and
      the identifying is according to a mapping in which the set of data array locations corresponding to the same cache set index are in different units of the data array, and a given unit of the data array comprises data array locations corresponding to a plurality of consecutive set indices, and
   accessing said data associated with the target address from one of the set of data array locations identified by the mapping circuitry.

* * * * *